US009275384B2

United States Patent
Sathe et al.

(10) Patent No.: US 9,275,384 B2
(45) Date of Patent: Mar. 1, 2016

(54) POINT OF SALE PAYMENT SYSTEM

(75) Inventors: Nikhil S. Sathe, Monte Sereno, CA (US); Norihiro Edwin Aoki, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 448 days.

(21) Appl. No.: 13/436,784

(22) Filed: Mar. 30, 2012

(65) Prior Publication Data

US 2012/0246018 A1    Sep. 27, 2012

Related U.S. Application Data

(63) Continuation of application No. 13/338,509, filed on Dec. 28, 2011.

(60) Provisional application No. 61/435,184, filed on Jan. 21, 2011.

(51) Int. Cl.
```
G06Q 20/20     (2012.01)
G06Q 10/02     (2012.01)
G06Q 20/14     (2012.01)
G06Q 10/08     (2012.01)
G06Q 20/10     (2012.01)
G06Q 20/32     (2012.01)
G07F 17/24     (2006.01)
```

(52) U.S. Cl.
CPC ........... *G06Q 20/20* (2013.01); *G06Q 10/02* (2013.01); *G06Q 10/08* (2013.01); *G06Q 10/087* (2013.01); *G06Q 20/10* (2013.01); *G06Q 20/145* (2013.01); *G06Q 20/3276* (2013.01); *G07F 17/24* (2013.01)

(58) Field of Classification Search
CPC combination set(s) only.
See application file for complete search history.

(56) References Cited

U.S. PATENT DOCUMENTS

| | | | |
|---|---|---|---|
| 5,910,782 A | 6/1999 | Schmitt et al. | |
| 6,340,935 B1 * | 1/2002 | Hall | 340/932.2 |
| 7,215,255 B2 * | 5/2007 | Grush | 340/932.2 |
| 8,160,959 B2 * | 4/2012 | Rackley et al. | 705/39 |
| 2005/0096974 A1 * | 5/2005 | Chagoly et al. | 705/13 |
| 2006/0116892 A1 * | 6/2006 | Grimes et al. | 705/1 |
| 2009/0125341 A1 * | 5/2009 | Somoza et al. | 705/5 |
| 2009/0234773 A1 * | 9/2009 | Hasson | 705/44 |
| 2010/0030629 A1 * | 2/2010 | Ward, II | 705/13 |
| 2010/0117863 A1 * | 5/2010 | Dutt | 340/932.2 |

(Continued)

OTHER PUBLICATIONS

Gao, J. et al. (2009). A 2D barcode-based mobile payment system. Third Int'l Conf. on Multimedia and Ubiquitous Eng.(IEEE).*
Zoghi, B. et al. (2006). RFID solutions: Parking optimization and customer satisfaction. Proceedings of the 2006 IJME—INTERTECH Conf.*
Shaheen, S. et al. (2005). Smart parking management field test: a Bay area rapid transit (BART) district parking demonstration. Final Report, CA Path Program, University of CA, Berkeley.*

(Continued)

*Primary Examiner* — Peter L Ludwig
(74) *Attorney, Agent, or Firm* — Haynes and Boone, LLP

(57) ABSTRACT

A method for point of sale payments includes receiving, from a seller device over a network, payment information. The payment information is associated with payment code information in a database. The payment code information is then sent to the seller device over the network for posting at a service location. The payment code information is then captured by a payer device at the service location and transmitted over the network. The payment information is then retrieved from the database using the associated payment code information. The payment information is then sent to the payer device over the network. A payment confirmation is received from the payer device over the network and, in response, a payment from a payer account to a seller account is initiated and the payment information and an indication of the payment confirmation is sent to the seller device over the network.

23 Claims, 17 Drawing Sheets

(56) References Cited

U.S. PATENT DOCUMENTS

| | | | |
|---|---|---|---|
| 2010/0191584 A1* | 7/2010 | Fraser et al. | 705/13 |
| 2011/0035261 A1* | 2/2011 | Handler | 705/13 |
| 2011/0143779 A1* | 6/2011 | Rowe et al. | 455/456.3 |
| 2011/0238464 A1* | 9/2011 | Dasgupta | 705/13 |
| 2011/0320243 A1* | 12/2011 | Khan | 705/13 |
| 2012/0095791 A1* | 4/2012 | Stefik et al. | 705/5 |
| 2012/0130775 A1* | 5/2012 | Bogaard et al. | 705/13 |
| 2012/0130872 A1* | 5/2012 | Baughman et al. | 705/32 |
| 2012/0130889 A1* | 5/2012 | Lyons et al. | 705/39 |
| 2012/0136780 A1* | 5/2012 | El-Awady et al. | 705/40 |

OTHER PUBLICATIONS

Carl Walker Inc. (2008). Downtown Chandler parking study. Draft Report.*

Inman, M. (2007). Task Two—Preliminary Alternatives Report—DRAFT. Letter to Mr. Lawton.*

Dewan, S. G. Mobile payment adoption in the US: a cross-industry cross-platform solution.*

Define: "graphic" as "a computer-generated image". See Random House Dictionary (2012).*

\* cited by examiner

POINT OF SALE PAYMENT SYSTEM

CROSS REFERENCE TO RELATED APPLICATION

This patent application is a continuation of U.S. patent application Ser. No. 13/338,509, filed Dec. 28, 2011, which claims priority to U.S. Provisional Patent Appl. Ser. No. 61/435,184, filed Jan. 21, 2011, all of which are incorporated by reference in their entirety.

BACKGROUND

1. Technical Field

Embodiments of the present disclosure generally relate to electronic payments, and more particularly, to systems and methods for making payments at a point of sale.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

However, financial transactions such as those conducted at a point of sale (POS) location generally require the provision by the customer of a physical form of payment that typically includes cash, a check, or a transaction card such as a credit card, a debit card, or gift card. Such conventional transactions are inefficient and introduce delays with the purchase of products and/or services at the POS location. In some embodiments that include POS locations include, for example, parking services, transportation services, restaurants, retail stores, etc. paying with a physical form of payment may delay the completion of the transaction as a result of the inability of the merchant to rapidly process the transaction. For example, in a restaurant, a customer will generally may have to wave down or wait for a busy server in order to provide a credit card for payment of the bill, then wait for the credit card to be processed, then wait for a receipt, etc. These delays are undesirable for the customer and time-consuming for the merchant, and may lead to decreased profits for the restaurant due to the resulting inefficiency in the turnover of tables.

In another embodiment, certain POS locations require "smart" POS devices to process payments, such as those made using transaction cards. For example, POS devices may need to be secure in order to communicate and possibly process sensitive financial information used to make the payment, which makes the devices costly to implement and maintain for the merchant. From the consumer side, such POS devices can be inconvenient, as they typically required the customer to make a payment at a centralized POS device that is typically remote to the product or service that is being purchased, such as, for example, when a consumer purchases the use of a parking space, a bus/train seat, a movie seat, etc.

Thus, there is a need for an improved point of sale payment system.

SUMMARY

According to one embodiment, a method for point of sale payments includes receiving payment information from a seller device operated by a seller. The seller may operate a service location (e.g., a parking lot) that includes a plurality of payment locations (e.g., parking spaces), and distinct payment information may be associated with each of the plurality of payment locations in the service location. Distinct payment information is then associated with distinct payment code information in a database, and the payment code information is sent to the seller device. The seller may then provide the distinct payment code information at each respective and distinct payment location as a sign or other physical representation of the payment code information. A payer wishing to make a payment to use the payment location may then use a payer device to capture the payment code information (e.g., by capturing an image of the payment code information) and transmit the payment code information such that it may be used to retrieve its associated payment information. That associated payment information may then be transmitted back to the payer device such that the payer may review it and provide a payment confirmation indicating that the payer would like to make a payment to the seller for the payment location. Upon receipt of the payment confirmation, the payment, information and an indication of the payment confirmation may be sent to the seller device to confirm to the seller that the payer has paid for the payment location.

As a result, the seller need only provide payment code information at a POS location in a relatively inexpensive physical sign, rather than implementing computing devices and/or other 'smart' point of sale systems. The payer may use their payer device (e.g., a smart phone that a majority of potential payers typically carry with them a majority of the time) to pay for the use of the payment location simply by capturing and sending the payment code information and confirming a payment. In some embodiments, the seller may use a seller device that receives indications of payment confirmations and their associated payment information in order to monitor whether payment locations in the service location have been paid for.

These and other features and advantages of the present disclosure will be more readily apparent from the detailed description of the embodiments set forth below taken in conjunction with the accompanying figures.

Figure 1:
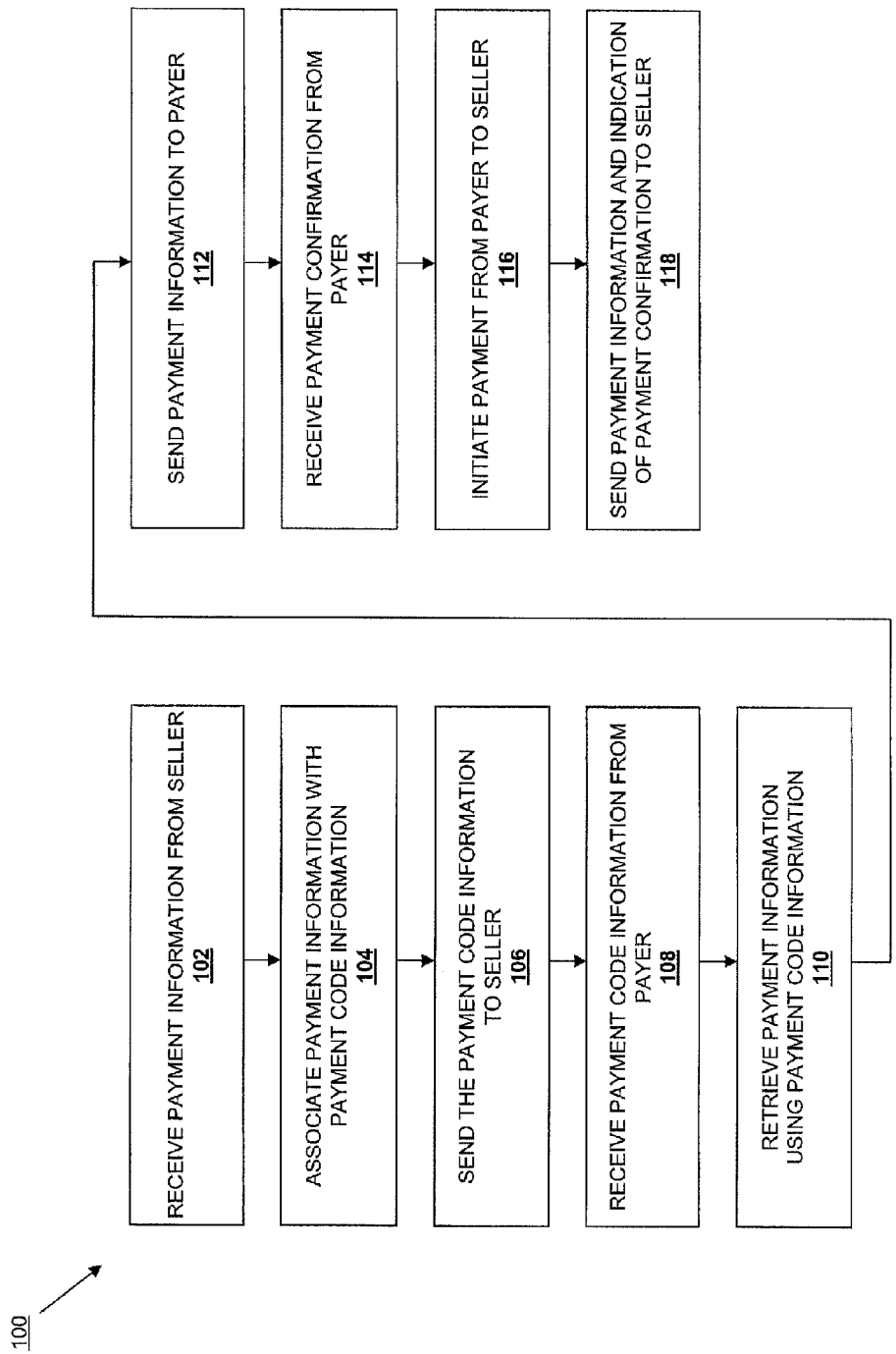
FIG. 1 is a flow chart illustrating an embodiment of a method for point of sale payments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for making point of sale payments. In an embodiment, a seller operates a service location including a plurality of payment locations. For each payment location in the service location, payment information for that payment location may be associated with payment code information in a payment information database, and the payment code information may be provided to the seller for provision adjacent its associated payment location in the service location. A payer includes a payer device having a payment application. In an embodiment, the payment application allows the payer to use a camera on the payer device to capture an image of the payment code information that is provided adjacent the payment location. The payment code information is sent to a payment information engine such that payment information associated with the payment code information may be retrieved and returned, over the network, to the payer device. The payer may then provide a payment confirmation so that a payment may be initiated from a payer account of a payer to a seller account of the seller, which then causes funds to be transferred from a funding account of the payer to the seller account.

Figure 2:
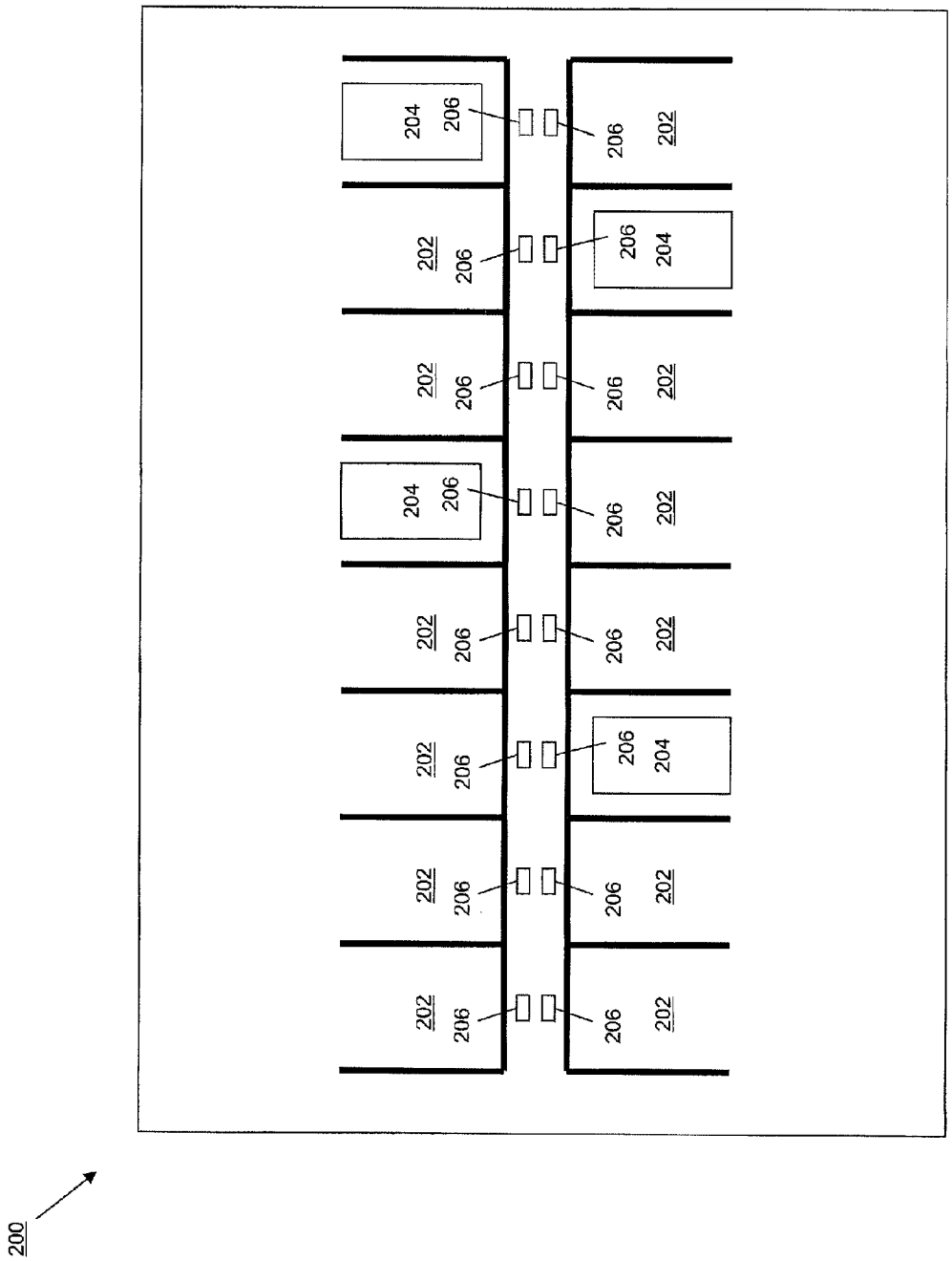
FIG. 2 is a schematic view illustrating an embodiment of a service location.

Referring now to FIGS. 1 and 2, a method 100 for point of sale (POS) payments is illustrated. A few embodiments of the POS payment system are provided below that include service locations having payment locations, such as the parking lot (with parking spaces) and train (with seats) described below. However, these embodiments are not meant to be limiting, and one of skill in the art will recognize that a variety of other POS payment scenarios will fall within the scope of the system and method described herein.

The method 100 begins at block 102 where payment information is received from a seller. In an embodiment, the POS payment system includes one or more payment information databases in which distinct payment information (e.g., for each payment location or other service provided in the POS payment system) is associated with distinct payment code information. For example, referring to FIG. 2, a seller may operate a service location 200 that, in the illustrated embodiment, includes a parking lot. The service location 200 includes a plurality of payment locations 202 that, in the illustrated embodiment, include parking spaces. In the embodiment illustrated in FIG. 2, a plurality of payers have paid for respective payment locations 202 in order to use the payment locations 202 to park their cars 204. In one example, at block 102, the seller may use a seller device to send distinct payment information that is associated with each distinct payment location 202 in the service location 200 to a payment information engine, described in detail below. In another example, an POS payment system provider may include a payment information engine that accepts payment information for payment locations in service locations from a plurality of different sellers. In this example, payment information may include additional information that is not directly related to the payment locations such as, for example, seller information about the seller. In another example, a payment service provider device that is located remote from the POS location and that is distinct from the seller may provide payment services such that the payer may make a payment to the seller without any direct exchange of information between the payer and the seller.

The method 100 then proceeds to block 104 where the payment information for each payment location is associated with distinct payment code information in the payment information databases. As described in further detail below, the distinct payment code information may include, for example, a distinct alphanumeric character string and/or other identifier known in the art that may be associated with payment information for each payment location in the payment information database. Thus, in one embodiment, the POS payment system may be seller-specific in that only a single seller's payment locations in their service location are available to be paid for using the POS payment system. In another embodiment, the POS payment system may provide for the payment for payment locations in a variety of service locations from a variety of different sellers who 'register' their service locations/payment locations with the POS payment system provider such that payment code information may be associated with each of their payment locations. In embodiments where a variety of different sellers provide their service locations/payment locations to the POS payment system, the distinct payment code information for each distinct payment location may therefore be associated with the service location and/or the seller of that payment location. While a few examples have been provided, one of skill in the art will recognize that payment code information may be associated, mapped, and/or otherwise related with payment information for payment locations in a database in a variety of other scenarios while remaining within the scope of the present disclosure.

In an embodiment, payment information for a payment location may include a number of details about the payment location such as, for example, an identifier for payment location (e.g., that allows the payment location to be distinguished from other payment locations in the service location), a cost for the payment location, any payment variables associated with the cost of the payment location (e.g., a payment rate that is a function of the amount of time the payment location is used), and/or a variety of other payment location information known in the art. The seller or POS payment system provider may enter the payment information for the payment locations of a service location into a database (e.g., using a web interface, through an Application Programming Interface (API), and/or using a variety of other methods known in the art) and relate, map, and/or other associate each distinct set of that payment information (i.e., payment information for a particular payment location) with distinct payment code information (which may be generated using methods known in the art). The payment information may also include the name of the seller, seller account information, seller contact information, a payment location description, etc.

The method 100 then proceeds to block 106 where the payment code information is sent to the seller. As discussed above, payment code information may include an alphanumeric character string and/or other identifier that may be generated using methods known in the art. The payment code information may be sent to a seller device and used by a seller to create a sign, a sticker, a tag, a card, a label, a magnet, a decal, and/or or other physical representation that includes the payment code information. For example, the payment code information may be used to create a sign that may include, for example, a Universal Product Code (UPC), an International Article Number (EAN), a Quick Response (QR) code, and/or a variety of other identifiers known in the art. Then, in an embodiment, at block 106, the payment code information associated with the payment information at block 104 of the method is sent to the seller device, and a sign may be created that includes the payment code information and that is located adjacent the payment location. For example, FIG. 2 illustrates a plurality of a signs 206, with each sign 206 located adjacent to and associated with a respective payment location 202 in the service location 200. While a few examples of payment code information are provided below, one of skill in the art will recognize that a variety of different payment code information will fall within the scope of the present disclosure.

Figure 3:
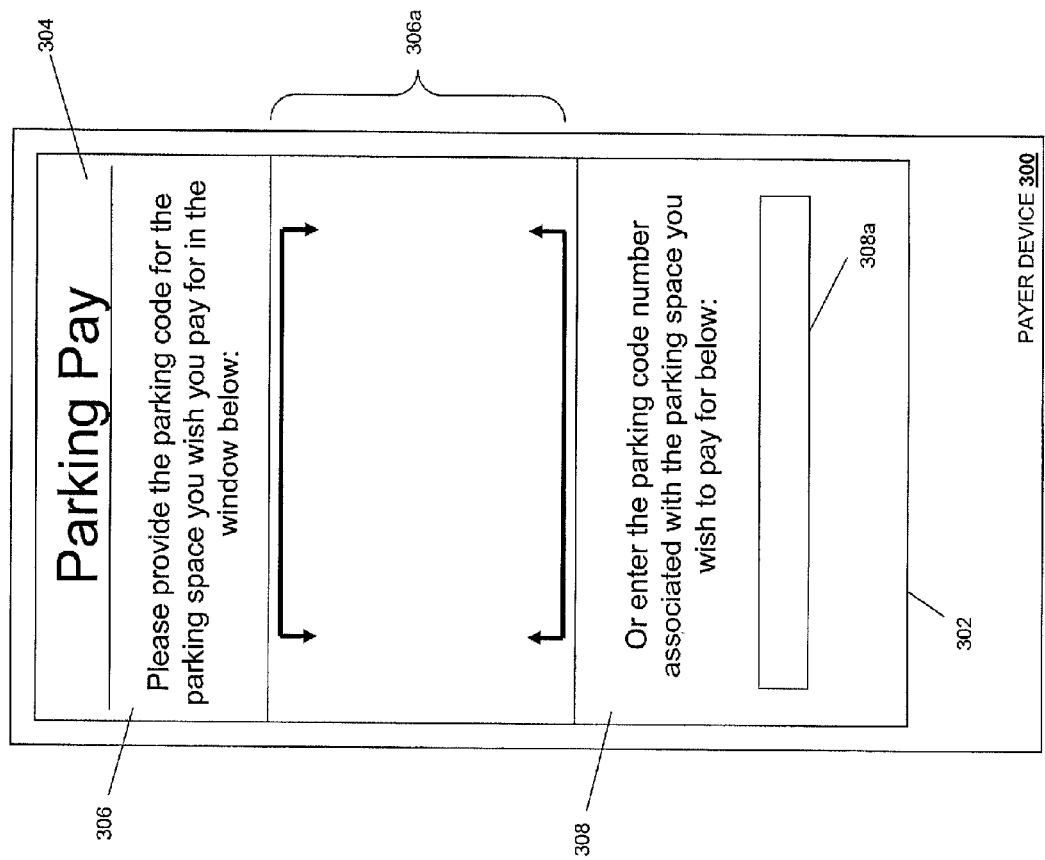
FIG. 3 is a screenshot illustrating an embodiment of a payment code information provision page.

Referring now to FIGS. 1, 2, and 3, the method 100 then proceeds to block 108 where payment code information is received from a payer. In the embodiment discussed below, a payer having a mobile payer device 300 such as, for example, a phone or other mobile computing device, enters the service location 200 of FIG. 2 and decides to pay for one of the payment locations 202. However, this embodiment is presented only as an example, and one of skill in the art will recognize that variety of other POS payment scenarios will fall within the scope of the present disclosure. At block 108, upon deciding to purchase one of the payment locations 202, the payer may use their payer device 300 to start a payer application that is included on the payer device 300. In an embodiment, the payer application includes instructions that are stored on a non-transitory, computer-readable medium that, when executed by a processor in the payer device, cause the processor to perform the functions of the payment application discussed below. The payment application may be provided by the operator of the POS payment system (e.g., a seller that operates the POS payment system, a POS payment system provider that operates the POS payment system for a plurality of sellers, etc.)

Activation of the payment application provides a payment code information provision page through the payment application on the payer device 300. FIG. 3 illustrates a payer device 300 that includes a display 302 displaying a payment code information provision page 304. The payment code information provision page 304 includes a first payment code information acquisition section 306 and a second payment code information acquisition section 308. In the illustrated embodiment, the first payment code information acquisition section 306 provides for the 'scanning', 'visual', or 'image' acquisition of payment code information, while the second payment code information acquisition section 308 provides for the 'manual', 'text', or otherwise more user intensive acquisition of payment tag information, as discussed in further detail below. The first payment code information acquisition section 306 includes an image capture window 306a, and the second payment code information acquisition section 308 includes a text input 308a.

Figure 4:
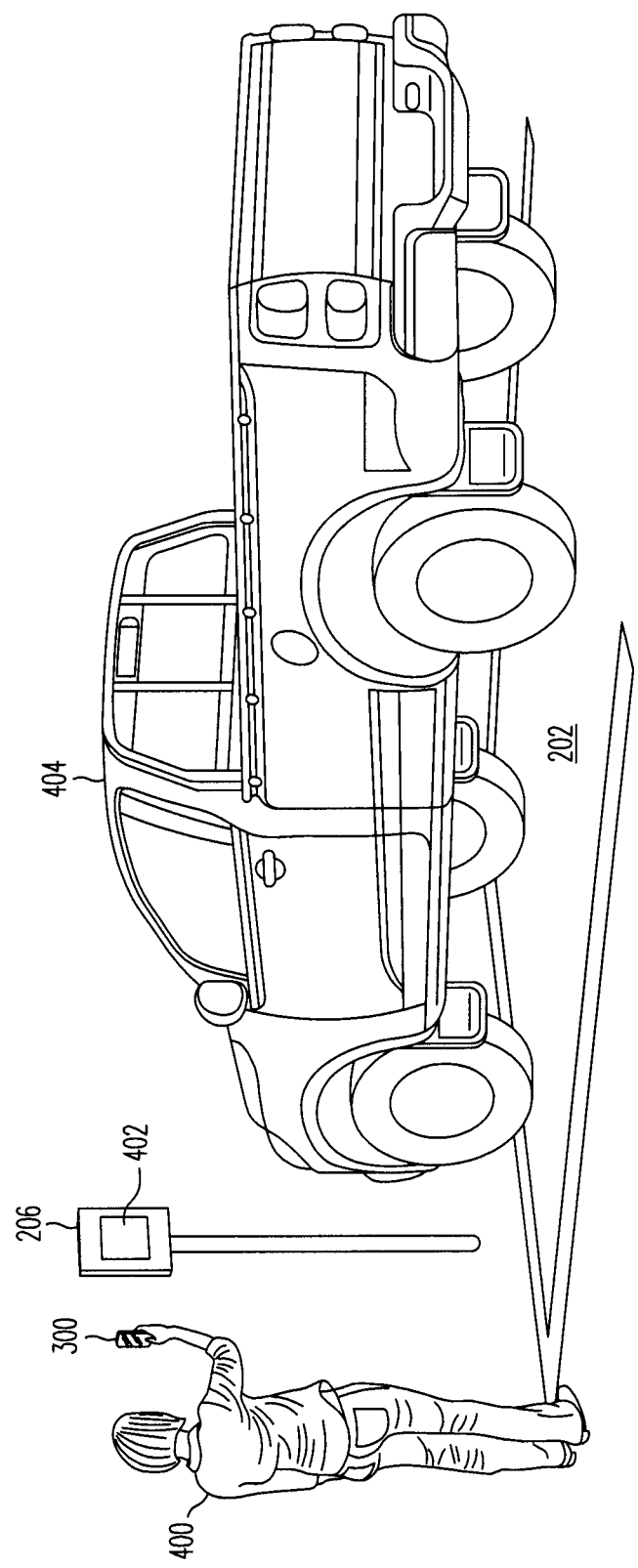
FIG. 4 is a perspective view illustrating an embodiment of a user capturing an image of payment code information located adjacent a payment location in the service location of FIG. 2.

FIG. 4 illustrates a user 400 using the payer device 300 to provide payment code information 402 that is located on the sign 206 in order to pay for a parking space 202 for a car 404. As can be seen in FIG. 4, in response to entering the service area 200, described above with reference to FIG. 2, and deciding to use the parking space 202, the user 400 has parked the car 404 in the parking space 202, started the payment application on the payer device 300, and is using the payment code information provision page 304 on the payer device 300 to capture the payment code information 402 using the payment application 304.

Figure 5:
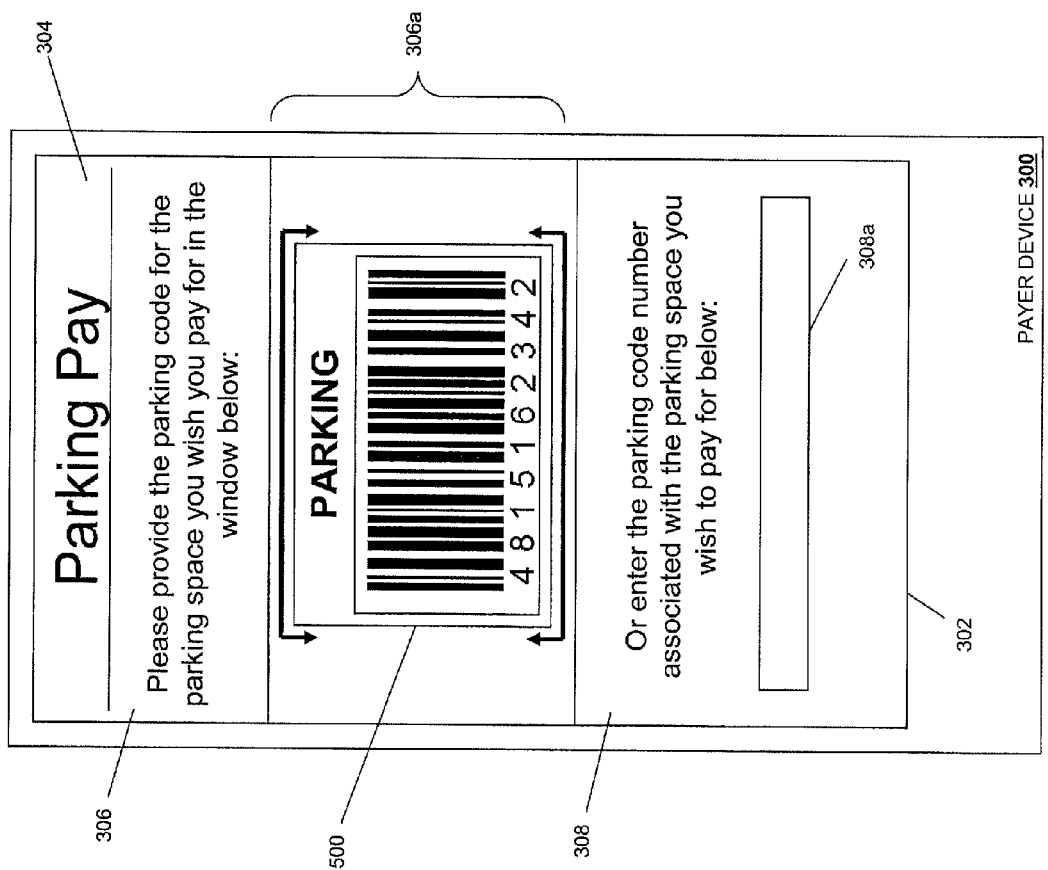
FIG. 5 is a screenshot illustrating an embodiment of the payment code information of FIG. 4 being captured using the payment code information provision page of FIG. 3.
Figure 6:
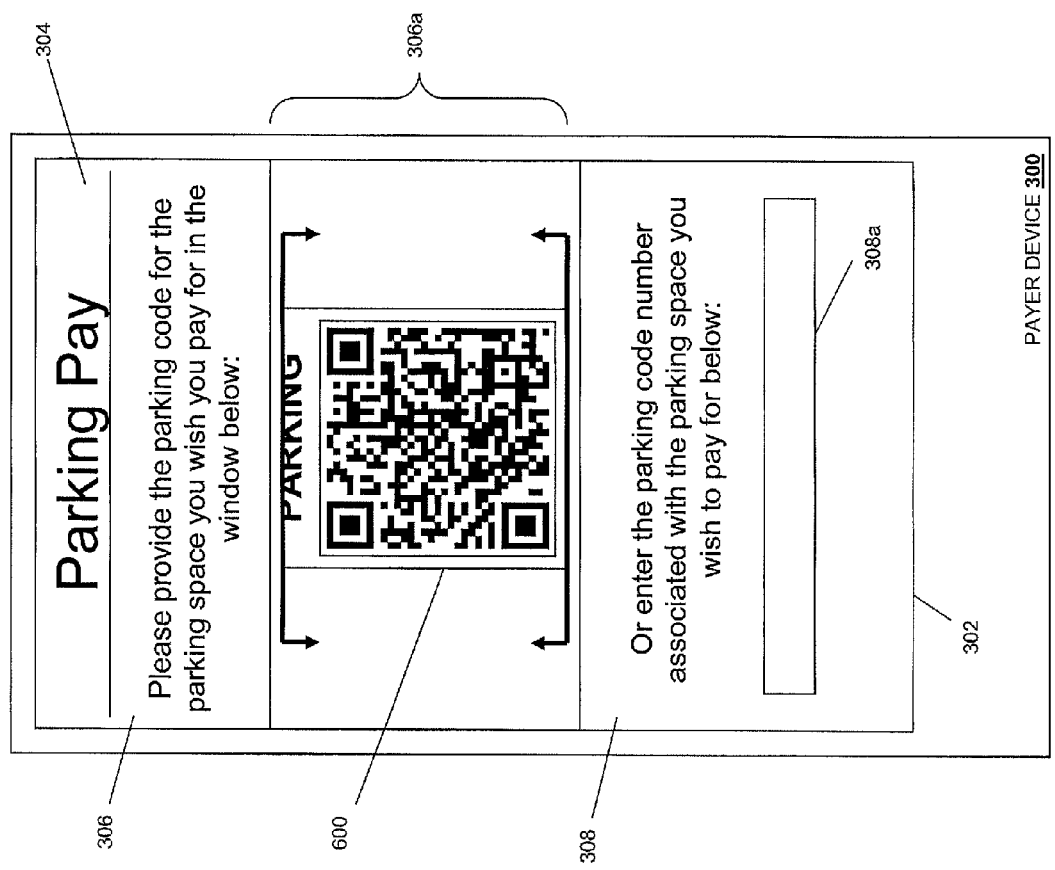
FIG. 6 is a screenshot illustrating an embodiment of payment code information of FIG. 4 being captured using the payment code information provision page of FIG. 3.

In the embodiment illustrated in FIG. 5, payment code information 500, which may be the payment code information 402 illustrated in FIG. 4, includes a UPC. The payer device 300 may include a camera that is operable to capture an image of the payment code information 500 and, using methods known in the art, the payment application may use the image to determine details of the payment code information 500 (e.g., the information encoded in the UPC). In another example, the payer device 300 may include a scanning device that is operable to provide a light source on the payment code information 500 and measure the intensity of the light reflected back, and the payment application may use the measured light intensities to determine the details of the payment tag information 500 using methods known in the art. In another embodiment, the payment code information 500 may include human-readable information (e.g., "4815162342" on the payment code information 500 in the illustrated embodiment) that the payer 400 may enter into the text input 308a in the second payment code information acquisition section 308, and the payment application may use the text string as the payment code information. In the embodiment illustrated in FIG. 6, payment code information 600, which may be the payment code information 402 illustrated in FIG. 4, includes a QR code. The payer device 300 may include a camera that is operable to capture an image of the payment code information 600 and, using methods known in the art, the payment application may use the image to determine the details of the payment code information 600 (e.g., the information encoded in the QR code).

The method 100 then proceeds to block 108 where payment code information is received from a payer. Upon capturing and/or determining the payment code information in block 106 of the method 100, the payment application sends the payment code information over a network to a payment information engine provided by an operator of the POS payment system. Thus, the operator of the POS payment system receives the payment code information. The method 100 then proceeds to block 110 where payment information is retrieved using the payment code information. Upon receiving the payment code information from the payer, the payment information engine then accesses a payment information databases and uses that payment code information to determine the payment information that is associated with that payment code information and payment location 202. In addition to the payment code information, the payer device may send information that identifies the payer device, the payer, the date and time of the transaction, etc.

Figure 7:
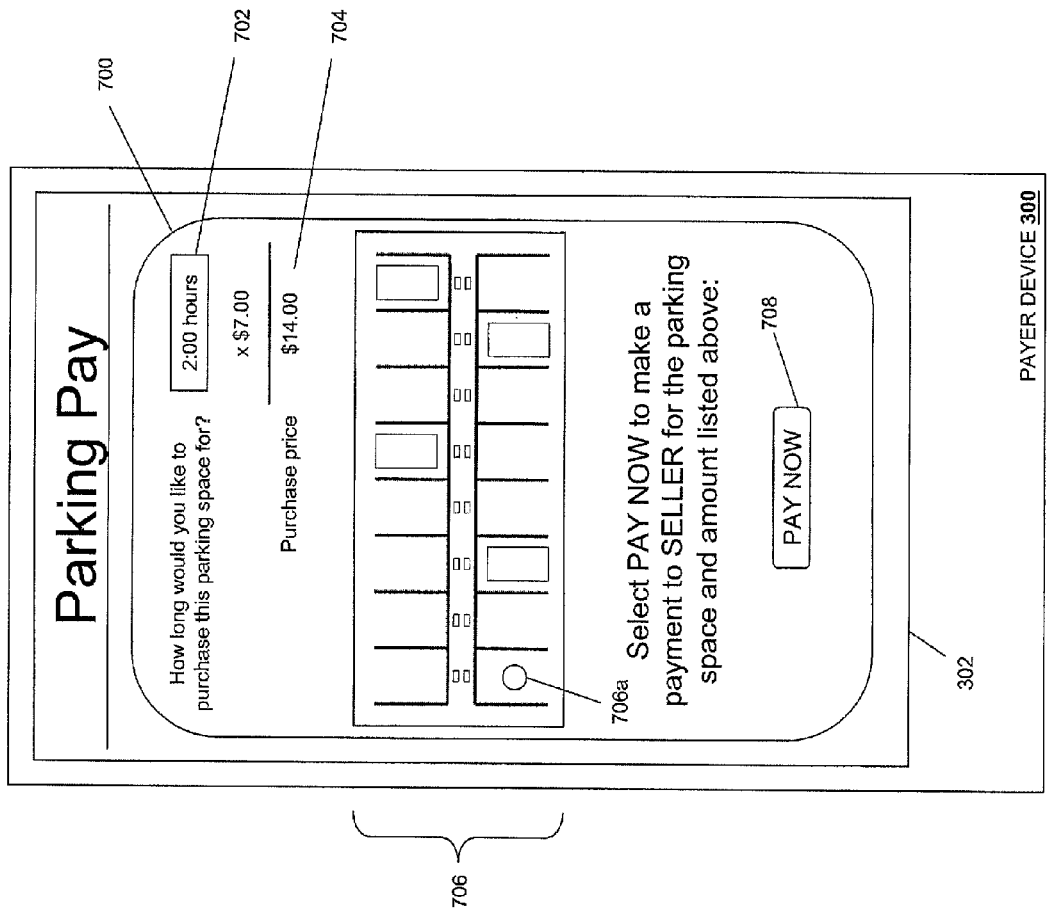
FIG. 7 is a screenshot illustrating an embodiment of payment information being displayed on a payer device.

Referring now to FIGS. 1 and 7, the method 100 then proceeds to block 112 where the payment information is sent to the payer. Upon retrieving the payment information, the payment information retrieval engine sends that payment information over the network to the payment application on the payer device 300. FIG. 7 includes illustrates the payer device 300 displaying (e.g., on the display 302), a payment information page 700 that includes the payment information associated with the payment code information sent in block 108 and received from the operator of the POS payment system in block 112. In the illustrated embodiment, the payment information page 700 includes a payment modifier 702, a payment total 704, a service location graphic 706, a payment location graphic 706a, and a payment confirmation indicator 708. As will be understood by one of skill in the art, the payer may use the payer device 300 to select, modify, or otherwise provide the payment modifier 702 (e.g., a time that the payment location/parking space will be used), and the payment total 704 will adjust based on the payment rate for the payment location. The service location graphic 706 provides the payer the layout of the service location and the payment location graphic 706a indicates to the payer which payment location in the service location the payer is about to pay for.

While one embodiment of the payment information page has been illustrated, one of skill in the art will recognize that a wide variety of changes to the payment information page will fall within the scope of the present disclosure. For example, using the parking services example described above, the payer may be given an option to authorize a payment for an undetermined amount of time (e.g., the payer will be charged for however long the car is parked in the parking space/payment location.) In another example, the payer may be allowed to move the payment location graphic 706a to different locations in the service location graphic in the event the payment location graphic 706a is incorrectly positioned (e.g., the user has captured the wrong payment code information relative to the payment location at which their car is parked.)

The method 100 then proceeds to block 114 where payment confirmation is received from the payer. Upon determining that the information on the payment information page 700 is accurate (e.g., the payment modifier is correct, the payment location graphic 706a is in the correct position in the service location graphic 706, etc.), the payer may select the payment confirmation indicator 708 in order to send a payment confirmation to a payer account engine used by the operator of the POS payment system. In an embodiment, the payer may have previously associated a payer account with the payment application such that the sending of the payment confirmation includes payer account information for the payer account of the payer. In another embodiment, the payer account of the payer may be associated with the payment application, but the payer may be prompted (e.g., upon selecting the payment confirmation indicator 708) to provide security credentials for the payer account such that the sending of the payment confirmation to the payment account engine includes payer account information for the payer account of the payer. In yet another embodiment, there may be no payer account associated with the payment application, and upon selection of the payment confirmation indicator 708, the payer may be redirected to a payer account page (not illustrated) that requests security credentials and allows the payer to use a payer account to make a payment.

The method 100 then proceeds to block 116 where a payment is initiated from the payer to the seller. Upon receiving the payment confirmation from the payer in block 114, the payment account engine may use seller account information that may have been included in the payment information associated with the payment code information, payer account information that may have been received along with the payment confirmation as discussed above, and the payment confirmation to initiate a payment from the payer to the seller. In one embodiment, the payer account and seller account are provided by a payment service provider such as, for example, PayPal, Inc. of San Jose, Calif., and the payment service provider is the operator of the POS payment system such that the a payment may be made from the payer account to the seller account upon receiving the payment confirmation in block 114. In another embodiment, the seller is the operator of the POS payment system, and the seller must then send the seller account information, the payer account information, and the payment confirmation to the payer account provider of the payer (e.g., a payment service provider, a funding account provider, etc.) such that a payment may be made from the payer account to the seller account. While a few examples have been provided of payments being made from a payer account to a seller account, one of skill in the art will recognize that a wide variety of payments and entities may be involved in the payment transfer been the payer account and the seller account while remaining within the scope of the present disclosure.

Figure 8:
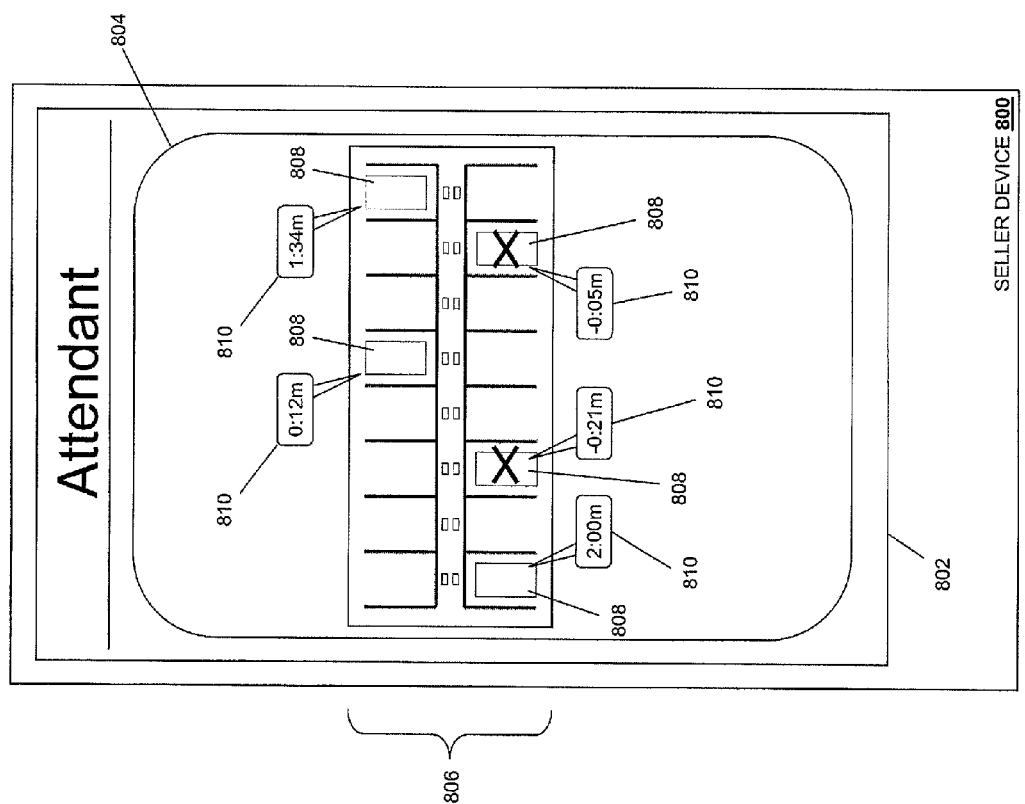
FIG. 8 is a screenshot illustrating an embodiment of a payment information being displayed on a seller device.

Referring now to FIGS. 1 and 8, the method 100 then proceeds to block 118 where payment information and an indication of payment confirmation are sent to the seller. The operator of the POS payment system, in response to receiving the payment confirmation in block 114, may send the seller (e.g., the seller device and/or other POS device at the service location) the payment information received with the payment confirmation, along with an indicator that the payer has confirmed the payment and/or that a payment has been initiated and/or that a payment has been completed between the payer account and the seller account. FIG. 8 illustrates a seller device 800 displaying a service location monitoring page 804 that may be provided with the payment information provided to the seller. The service location monitoring page 804 includes a service location graphic 806 that includes the payment locations along with payer graphics 808 in the occupied payment locations. The service location monitoring page 804 may provide an attendant with a variety of functionality such as, for example, paid time left indicators 810 that may be provided when the attendant selects one of the payer graphics 808 on the service location monitoring page 804. Other indicators may be provided as well, such as the time expired indicators (e.g., the X's over the payer graphics 808) that indicate that the payment locations are being occupied but are no longer paid for. Thus, the seller may use the seller device to manage and track payments for the payment locations at the service location. In an embodiment, a payment confirmation or receipt may be sent to the payer on the payer device in response to the initiation and/or completion of the payment to the seller. While a few examples have been provided of functionality for a service location monitoring page 804, one of skill in the art will recognize that a wide variety of functionality will remain within the scope of the present disclosure.

Thus, a system and method have been described that allow a seller to use "dumb" point of sale signs for use with 'smart' payer devices such that payers can pay for parking services provided by the seller. The 'dumb' point of sale signs are cheap and easy to maintain, eliminate the need for the seller to provide a 'smart' POS device to receive or process payments, and simply require the payer to use their 'smart' phones in order to pay the seller for use of their parking services. In addition, in some embodiments in which the seller is not the operator of the POS payment system (e.g., when a trusted third party provider operates the POS payment system), the payer need not provide sensitive information directly to the seller in order to complete the purchase.

Figure 9:
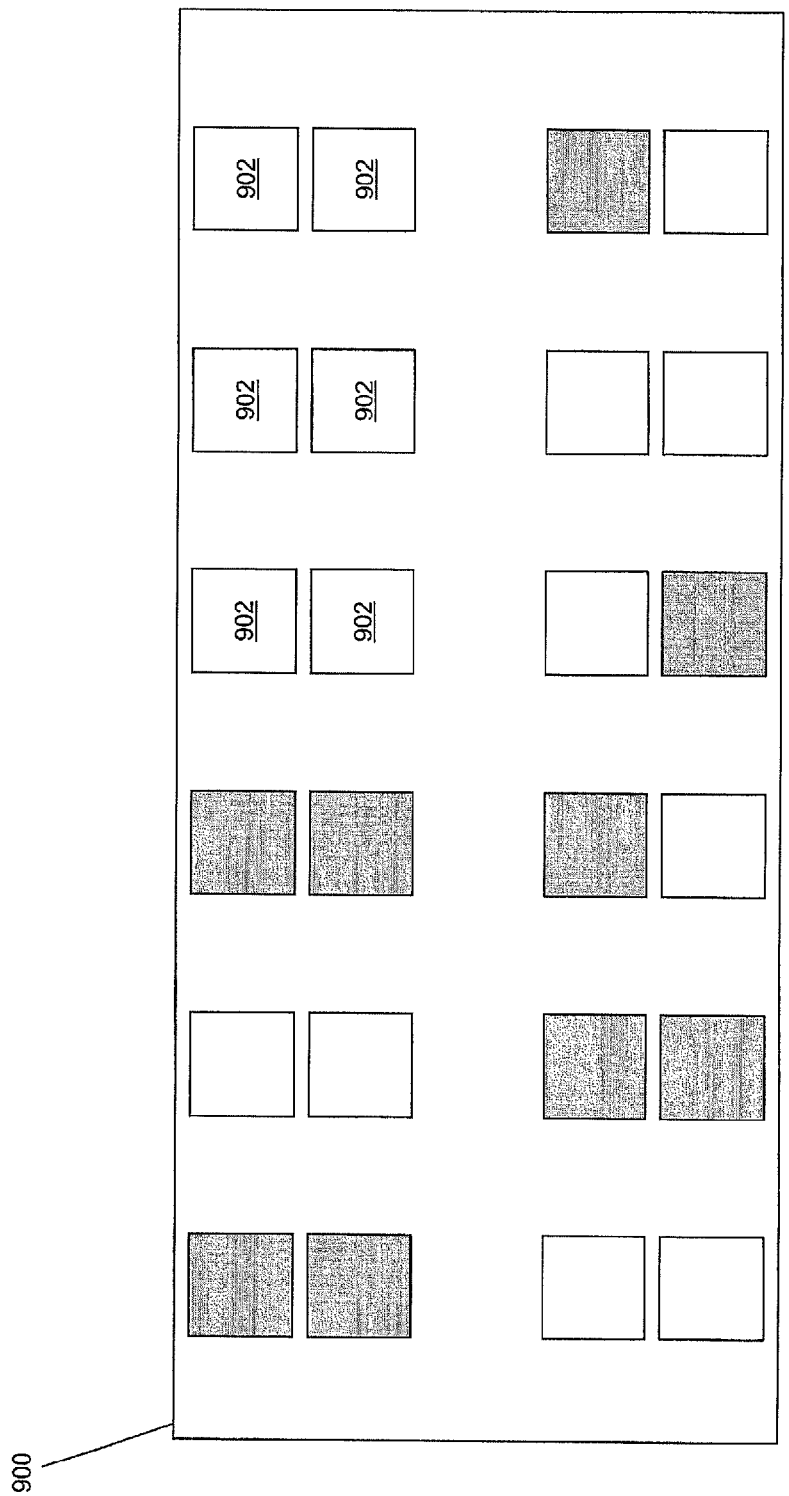
FIG. 9 is a schematic view illustrating an embodiment of a service location.

Referring now to FIGS. 1 and 9, another embodiment of the method 100 for point of sale (POS) payments is illustrated. The method 100 begins at block 102 where payment information is received from a seller. For example, referring to FIG. 9, a seller may operate a service location 900 that, in the illustrated embodiment, includes a train. The service location 900 includes a plurality of payment locations 902 that, in the illustrated embodiment, include seats on the train. In the embodiment illustrated in FIG. 9, a plurality of payers have paid for respective payment locations 902 (e.g., in the illustrated embodiment, the darkened payment locations 902 may correspond to train seats 902 that have been paid for by payers) in order to use the payment locations 902 during travel on the train. In one example, at block 102, the seller may use a seller device to send payment information that is associated with the payment locations 902 in the service location 900 to a payment information engine, described in detail below. In another example, a POS payment system provider may include a payment code engine that accepts payment information for payment locations in service locations from a plurality of different sellers. In this example, the payment information may include additional information that is not directly related to the payment location such as, for example, seller information about the seller.

Figure 10:
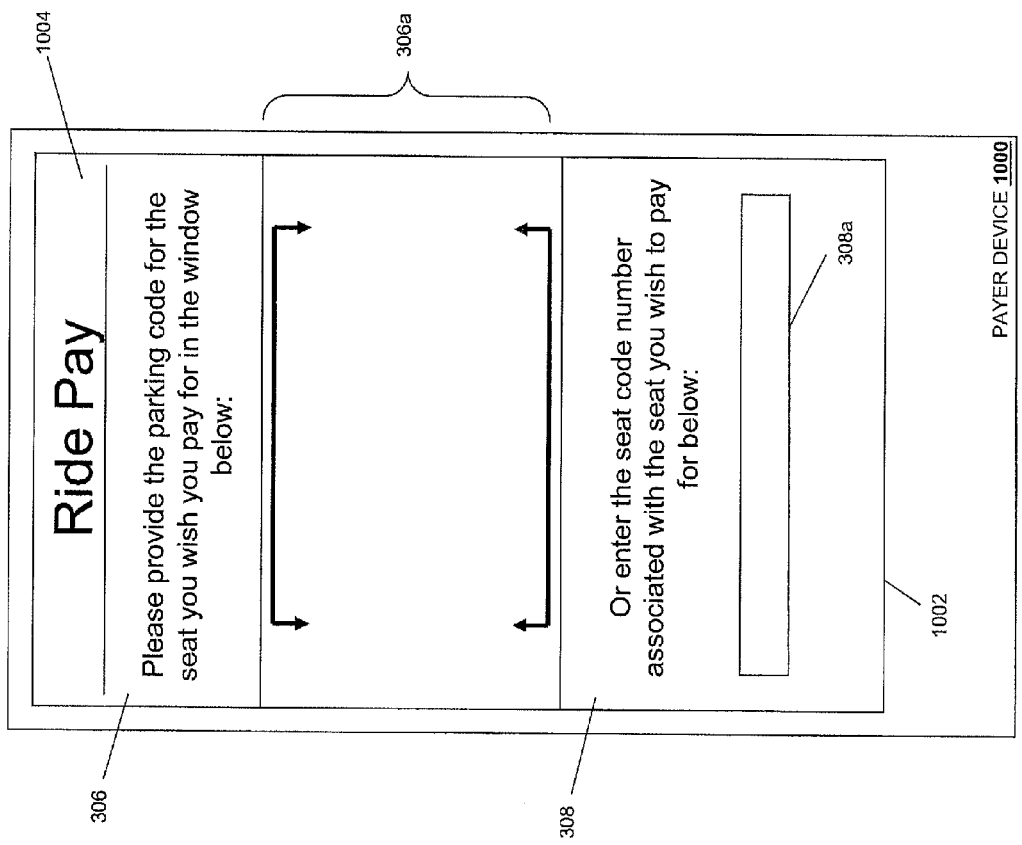
FIG. 10 is a screenshot illustrating an embodiment of a payment code information provision page.

The method 100 then proceeds to block 104 where the payment information is associated with the payment code information substantially as described above, and block 106 where the payment code information is sent to the seller substantially as described above. The method 100 then proceeds to block 108 where payment code information is received from a payer. Referring now to FIG. 10, a payer device 1000 is illustrated that is similar to the payer device 300, described above, but with a payment application displaying a payment code information provision page 1004 on the display 1002 of the payer device 1000. In the embodiment illustrated in FIG. 10, the payment application is 'tailored' to the service location 900 and includes a first payment information acquisition section 1006 with an image capture window 1006a and a second payment code information acquisition section 1008 with a text input 1008a that operating substantially similarly to the first payment code information acquisition section 306, image capture window 306a, second payment code information acquisition section 308, and text input 308a described above with reference to FIG. 3.

Figure 11:
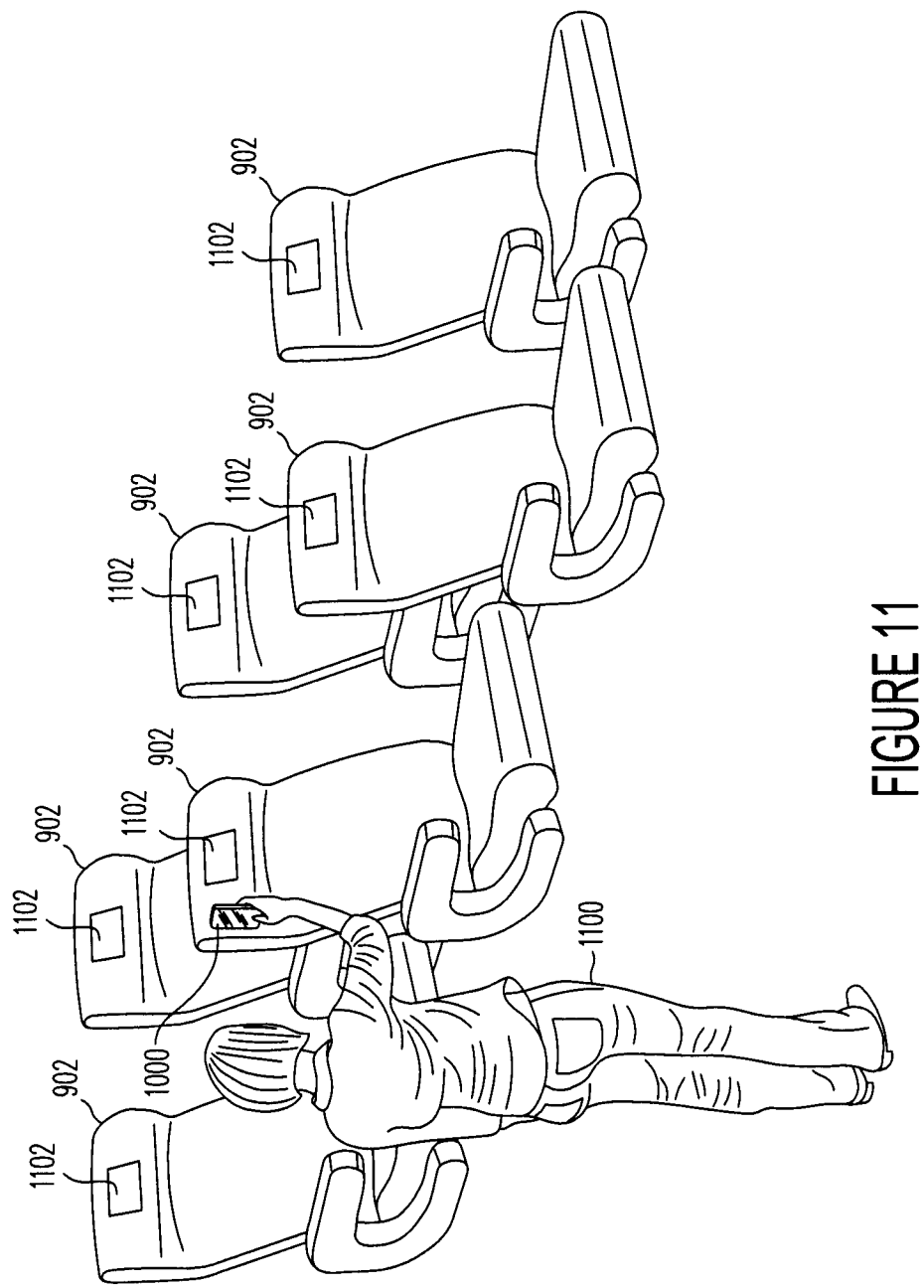
FIG. 11 is a perspective view illustrating an embodiment of a user capturing an image of payment code information located adjacent a payment location in the service location of FIG. 9.

FIG. 11 illustrates a payer 1100 capturing payment code information 1102 posted in one of the payment locations 902. As can be seen, the seller has provided payment code information 1102 on each of the payment locations 902 (train seats) in the service location 900 (train). The payer 1100 has decided to purchase one of the payment locations and, in response, is capturing an image of the payment code information 1102 that is posted on that payment location 902 (in the illustrated embodiment, a sign located on the head rest of the train seat.) While the payment code information 902 has been illustrated as being provided on the head rests of the train seats, the payment code information may be provided in a variety of other locations such as, for example, on the seatback in front of the seat, on the floor, on an armrest, or in a variety of other locations adjacent the train seat. The payment code information 1102 may then be sent to the operator of the POS payment system substantially as discussed above.

Figure 12:
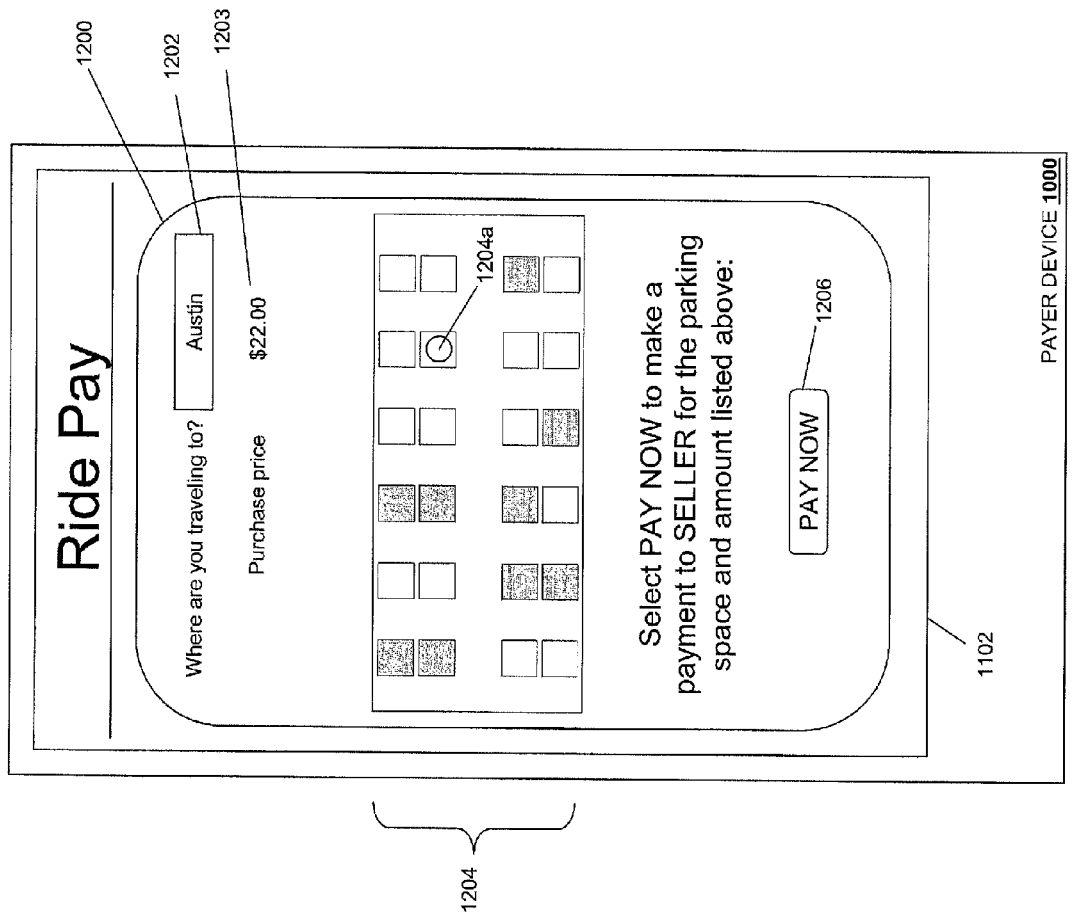
FIG. 12 is a screenshot illustrating an embodiment of payment information being displayed on a payer device.

The method 100 then proceeds to block 110 where the payment information is retrieved using the payment code information substantially as described above. Referring now to FIG. 12, at block 112 the payment information is sent to the payer and may be used to provide a payment information page 1200. The payment information page 1200 includes a payment modifier 1202 that, in the illustrated embodiment, allow the payer to select, modify, or otherwise indicate a destination to which the payer wishes to travel. A payment total 1203 provides a total payment amount that may be adjusted depending on the destination included in the payment modifier 1202. A service location graphic 1204 is provided on the payment information page 1200 that illustrates the service location 900 and includes a payment location indicator 1204a that indicates which payment location 902 in the service location 900 the payer is paying for. A payment confirmation indicator 1206 is provided on the payment information page 1200 and operates in substantially the same manner as the payment confirmation indicator discussed above. Thus, the payer may provide details such as a destination and a payment location, and then select the payment confirmation indicator 1206 in order to send the payment confirmation in block 114. In other embodiments, payment modifiers on the payment information page 1200 may include upgrades or options such as, for example, food or beverage orders.

In other embodiments of the train service location 900 discussed above, a wide variety of modifications are envisioned as falling within the scope of the present disclosure. For example, a location determination device such as a Global Positioning System (GPS) may be used to determine the distance traveled by the payer device and, hence, the payer. Thus, the payer may authorize a payment using the payment code information and payment information discussed above, and the POS payment system may determine the amount of the payment by determining the distance traveled by the payer (e.g., the payment amount may be calculated in response to detection of the payer device leaving the train 900.) In another embodiment, the payer may purchase a specific payment location 902, and then move within the service location 900 to a different payment location 902, and the payment application may allow the payer to change the payment location 902 associated with the payment such that it reflects the payment location 902 to which the payer has moved. In yet another embodiment, proof of payment may be provided to the payer device (e.g., a receipt or other identifier) such that the payer may move around the service location while still having proof that they have paid for one of the payment locations.

Figure 13:
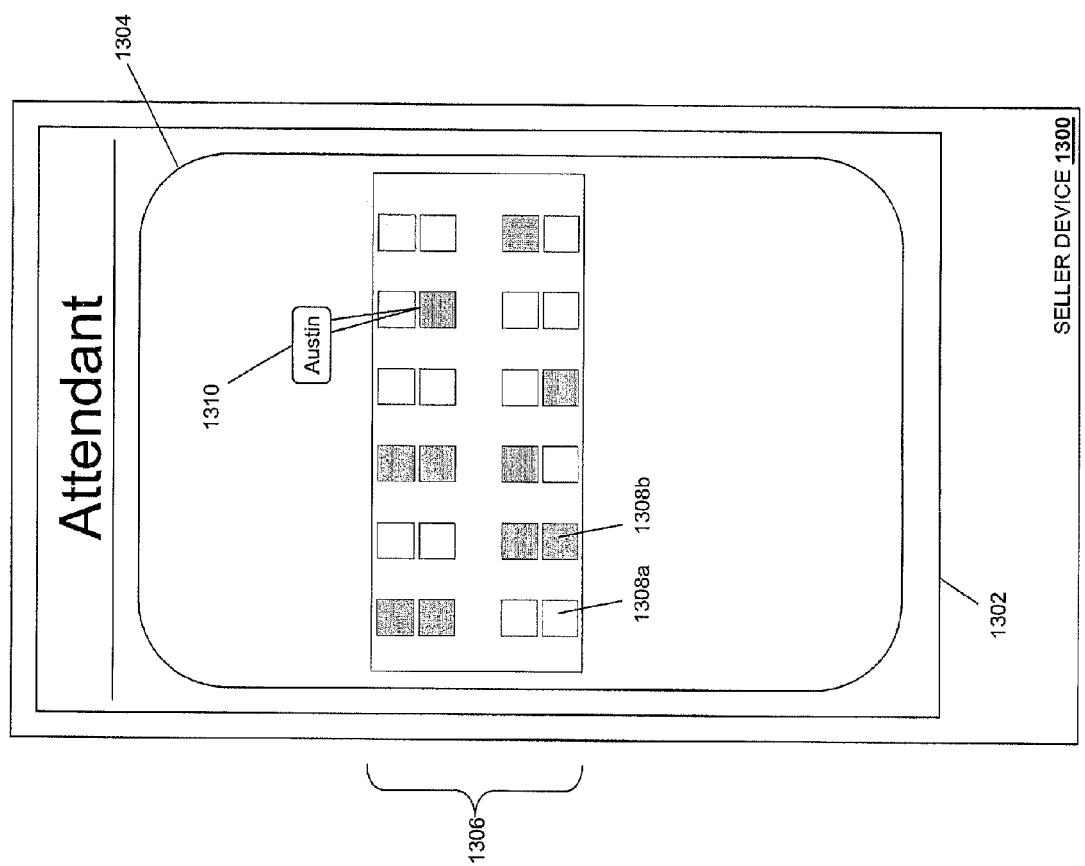
FIG. 13 is a screenshot illustrating an embodiment of payment information being displayed on a seller device.

Upon receiving the payment confirmation from the payer in block 114, the method 100 proceeds to block 116 where a payment is initiated from the payer to the seller substantially as described above. The method then proceeds to block 118 where the payment information and the indication of the payment confirmation is sent to the seller substantially as described above. FIG. 13 includes a seller device 1300 including a display 1302 that displays a service location monitoring page 1304. The service location monitoring page 1304 includes a service location graphic 1306 that includes payment location graphics that include open seats 1308a and purchased seats 1308b, with the purchased seats 1308b grayed out relative to the open seats 1308a. As can be seen, an attendant may use the seller device 1300 to select a purchased seat in order to be presented with a destination indicator 1310 that indicates the destination that was paid for in the purchase of that purchased seat. In other embodiments, the destination indicator may show a variety of other information such as, for example, a payer name.

In another example, a second payer may attempt to purchase a previously purchased payment location by sending the payment code information using their payer device according to the method 100 above. In such an example, the payment information engine may determine that the payment code information received from the second payer is already associated with the payment for that payment location and, thus, the payment location is 'taken'. In such a situation, the payment information engine may provide to the payer device of the second payer a declined payment indicator that may indicate that the payment location has been purchased and that the second payer much purchase a different payment location.

Thus, another embodiment of a system and method have been described that allow a seller to use "dumb" point of sale signs for use with smart payer devices such that payers can pay for transportation services provided by the seller. The 'dumb' point of sale signs are cheap and easy to maintain, and simply require the payer to use their 'smart' phones in order to pay the seller for use of their transportation services.

As discussed above, a wide variety of embodiments of the POS payment system other than the parking services and transportation services, illustrated and described above, are envisioned as falling within the scope of the present disclosure. For example, the POS payment system may be implemented in a restaurant. In one embodiment, a restaurant (service location) may include a plurality of tables (payment locations), and payment code information may be provided at each table. Thus, a server may charge food and drinks to the table, and the payer may pay for the bill at any time using their payer device to capture the payment code information, review the bill (payment information), and provide a payment according to the method 100 above. Furthermore, the server or restaurant owner may review the tables that have paid using the seller devices and service location monitoring pages discussed above.

In another embodiment, a restaurant such as, for example, a fast food restaurant, may include a menu in which each food or drink item is associated with payment code information. The user may then capture the payment code information for each of the food and/or drink items they wish to purchase, and pay for those food and drink items according to the method 100 discussed above. Payment modifiers may be provided during the method 100 to allow the payer to modify the food and/or drink items according to the desires of the payer, including amounts/quantities, desired features, etc.

In a further embodiment, the POS payment system may be implemented in retail stores (e.g., payment code information may be associated with clothing articles), gyms, spas, offices, theaters, concert halls, and/or a variety of other businesses known in the art.

Figure 14:
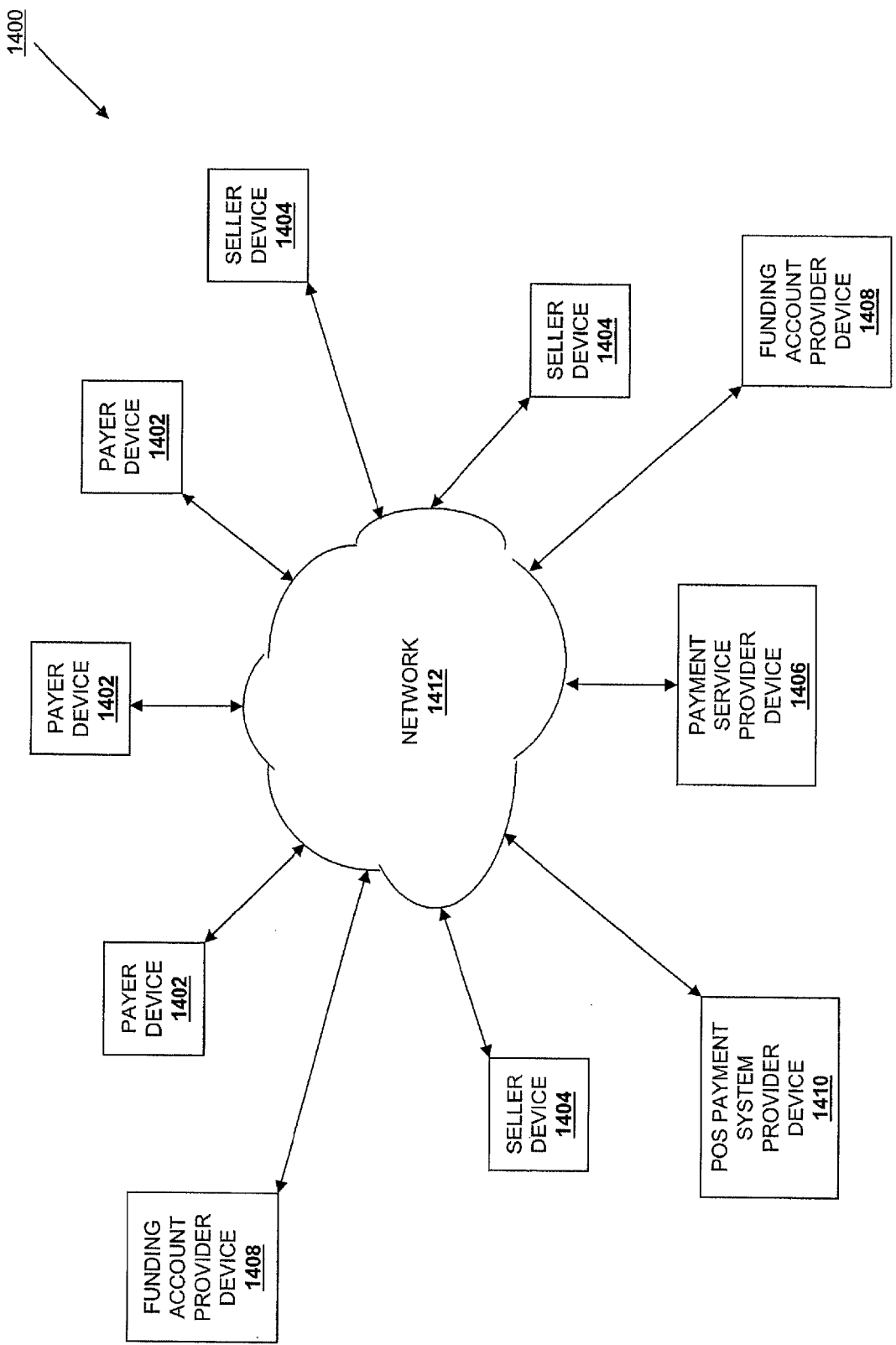
FIG. 14 is a schematic view illustrating an embodiment of a networked system.

Referring now to FIG. 14, an embodiment of a networked system 1400 used in the POS payment system described above is illustrated. The networked system 1400 may include any or all of a plurality of payer devices 1402, a plurality of seller devices 1404, a payment service provider device 1406, a plurality of funding account holder devices 1408, and/or a POS payment system provider device 14110 in communication over a network 1412. Any of the payer devices 1402 may be the payer devices 300 and/or 1000 discussed above. The seller devices 1404 may be the seller devices 800 and/or 1300 operated by the sellers of the service locations discussed above. The payment service provider device 1406 may be operated by a payment service provider such as, for example, PayPal Inc. of San Jose, Calif., as discussed above. The funding account provider devices 1408 may be funding account provider devices operated by funding account providers such as, for example, credit card account providers, bank account providers, savings account providers, and a variety of other account providers known in the art. The POS payment system provider device 1410 may be operated by a POS payment system provider as discussed above. One of skill in the art will recognize that some of the devices in the networked system 1400 may not be necessary in different embodiments. For example, where the POS payment system is provided by a seller, the POS payment system provider device 1410 and/or the payment service provider device 1406 may not be included in the networked system 1400. In another example, where the online payment system is provided by a payment service provider device 1406, the POS payment system provider device 1410 may not be included in the networked system 1400. In another example, where the online payment system is provided by a funding account provider device 1408, the online payment system provider device 1410 and the payment service provider device 1406 may not be included in the networked system 1400. Thus, one of skill in the art will recognize that a variety of modifications may be provided to the networked system 1400 while remaining within the scope of the present disclosure.

The payer devices 1402, seller devices 1404, payment service provider device 1406, funding account provider devices 1408, and/or the POS payment service provider device 1410 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1400, and/or accessible over the network 1412.

The network 1412 may be implemented as a single network or a combination of multiple networks. For example, in various embodiments, the network 1412 may include the Internet and/or one or more intranets, landline networks, wireless networks, and/or other appropriate types of networks.

The payer devices 1402 may be implemented using any appropriate combination of hardware and/or software configured for wired and/or wireless communication over network 1412. For example, in one embodiment, the payer devices 1402 may be implemented as a personal computer of a user in communication with the Internet. In other embodiments, the payer devices 1402 may be a smart phone, personal digital assistant (PDA), laptop computer, and/or other types of computing devices.

The payer devices 1402 may include one or more browser applications which may be used, for example, to provide a convenient interface to permit the payer to browse information available over the network 1412. For example, in one embodiment, the browser application may be implemented as a web browser configured to view information available over the Internet.

The payer devices 1402 may also include one or more toolbar applications which may be used, for example, to provide user-side processing for performing desired tasks in response to operations selected by the payer. In one embodiment, the toolbar application may display a user interface in connection with the browser application. In another embodiment, the toolbar application may provide the payment application, discussed above.

The payer devices 1402 may further include other applications as may be desired in particular embodiments to provide desired features to the payer devices 1402. In particular, the other applications may include the payment application, discussed above, for payments assisted by a payment service provider through the payment service provider device 1406. The other applications may also include security applications for implementing user-side security features, programmatic user applications for interfacing with appropriate application programming interfaces (APIs) over the network 1412, or other types of applications. Email and/or text applications may also be included, which allow the payer to send and receive emails and/or text messages through the network 1412. The payer devices 1402 include one or more user and/or device identifiers which may be implemented, for example, as operating system registry entries, cookies associated with the browser application, identifiers associated with hardware of the payer devices 1402, or other appropriate identifiers, such as a phone number. In one embodiment, the user identifier may be used by the payment service provider device 1406, funding account provider devices 1408, and/or online payment service provider device 1410 to associate the user with a particular account as further described herein.

The seller devices 1404 may be maintained, for example, by the seller of the product, a conventional or on-line merchant, conventional or digital goods seller, individual seller, and/or application developer offering various products and/or services in exchange for payment to be received conventionally or over the network 1412. In this regard, the seller devices 1404 may include a database identifying available products and/or services which may be made available for viewing and purchase by the payer. In addition, databases identifying available products and/or services will be available to any provider of the online payment system, as discussed above.

Figure 15:
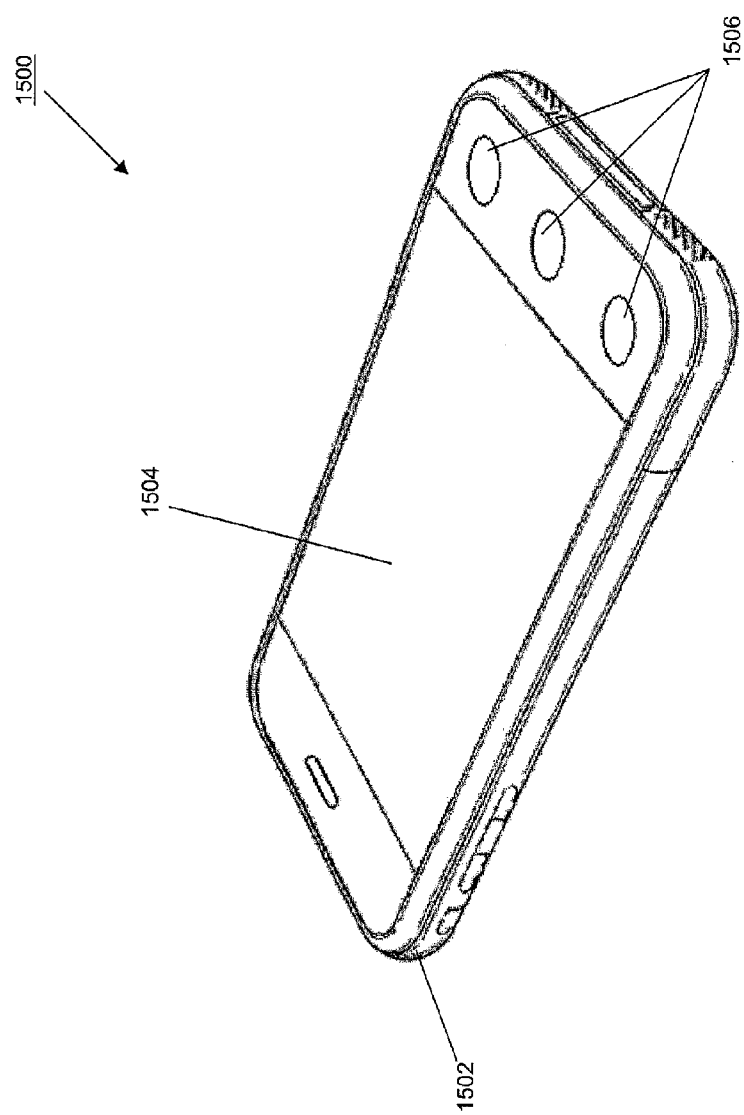
FIG. 15 is a perspective view illustrating an embodiment of a payer device.

Referring now to FIG. 15, an embodiment of a payer device 1500 is illustrated. The payer device 1500 may be the payer devices 300, 1000, and/or 1402. The payer device 1500 includes a chassis 1502 having a display 1504 and an input device including the display 1504 and a plurality of input buttons 1506. One of skill in the art will recognize that the payer device 1500 is a portable or mobile phone including a touch screen input device and a plurality of input buttons that allow the functionality discussed above with reference to the method 100. However, a variety of other portable/mobile payer devices may be used in the method 100 without departing from the scope of the present disclosure.

Figure 16:
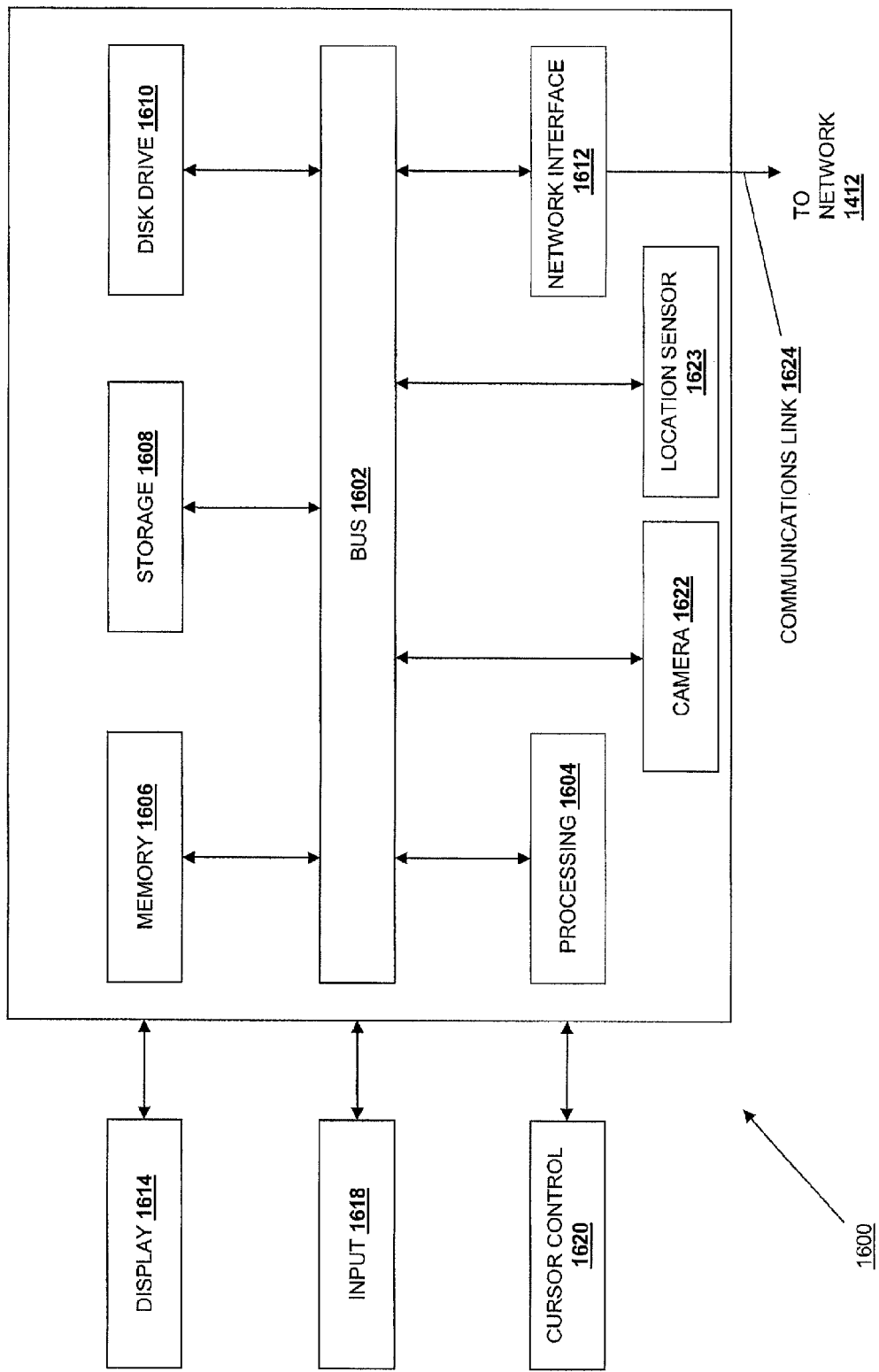
FIG. 16 is a schematic view illustrating an embodiment of a computer system.

Referring now to FIG. 16, an embodiment of a computer system 1600 suitable for implementing, for example, the payer devices 300, 1000, 1402, and/or 1500, the seller devices 800, 1300, and/or 1404, the payment service provider device 1406, the funding account provider devices 1408, and/or the POS payment service provider device 1410 is illustrated. It should be appreciated that other devices utilized by payers, sellers, payment service providers, funding account providers, and/or online payment service providers in the payment system discussed above may be implemented as the computer system 1600 in a manner as follows.

In accordance with various embodiments of the present disclosure, computer system 1600, such as a computer and/or a network server, includes a bus 1602 or other communication mechanism for communicating information, which interconnects subsystems and components, such as a processing component 1604 (e.g., processor, micro-controller, digital signal processor (DSP), etc.), a system memory component 1606 (e.g., RAM), a static storage component 1608 (e.g., ROM), a disk drive component 1610 (e.g., magnetic or optical), a network interface component 1612 (e.g., modem or Ethernet card), a display component 1614 (e.g., CRT or LCD), an input component 1618 (e.g., keyboard, keypad, or virtual keyboard), a cursor control component 1620 (e.g., mouse, pointer, or trackball), a camera component 1622, and/or a location determination device 1623 (e.g., a Global Positioning System (GPS) device as illustrated, a cell tower triangulation device, and/or a variety of other location determination devices known in the art.) In one implementation, the disk drive component 1610 may comprise a database having one or more disk drive components.

In accordance with embodiments of the present disclosure, the computer system 1600 performs specific operations by the processor 1604 executing one or more sequences of instructions contained in the memory component 1606, such as described herein with respect to the payer devices 300, 1000, 1402, and 1500, the seller devices 800, 1300, and 1404, the payment service provider device 1406, the funding account provider devices 1408, and/or the POS payment service provider device 1410. Such instructions may be read into the system memory component 1606 from another computer readable medium, such as the static storage component 1608 or the disk drive component 1610. In other embodiments, hard-wired circuitry may be used in place of or in combination with software instructions to implement the present disclosure.

Logic may be encoded in a computer readable medium, which may refer to any medium that participates in providing instructions to the processor 1604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1610, volatile media includes dynamic memory, such as the system memory component 1606, and transmission media includes coaxial cables, copper wire, and fiber optics, including wires that comprise the bus 1602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1600. In various other embodiments of the present disclosure, a plurality of the computer systems 1600 coupled by a communication link 1624 to the network 1412 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1600 may transmit and receive messages, data, information and instructions, including one or more programs (i.e., application code) through the communication link 1624 and the network interface component 1612. The network interface component 1612 may include an antenna, either separate or integrated, to enable transmission and reception via the communication link 1624. Received program code may be executed by processor 1604 as received and/or stored in disk drive component 1610 or some other non-volatile storage component for execution.

Figure 17:
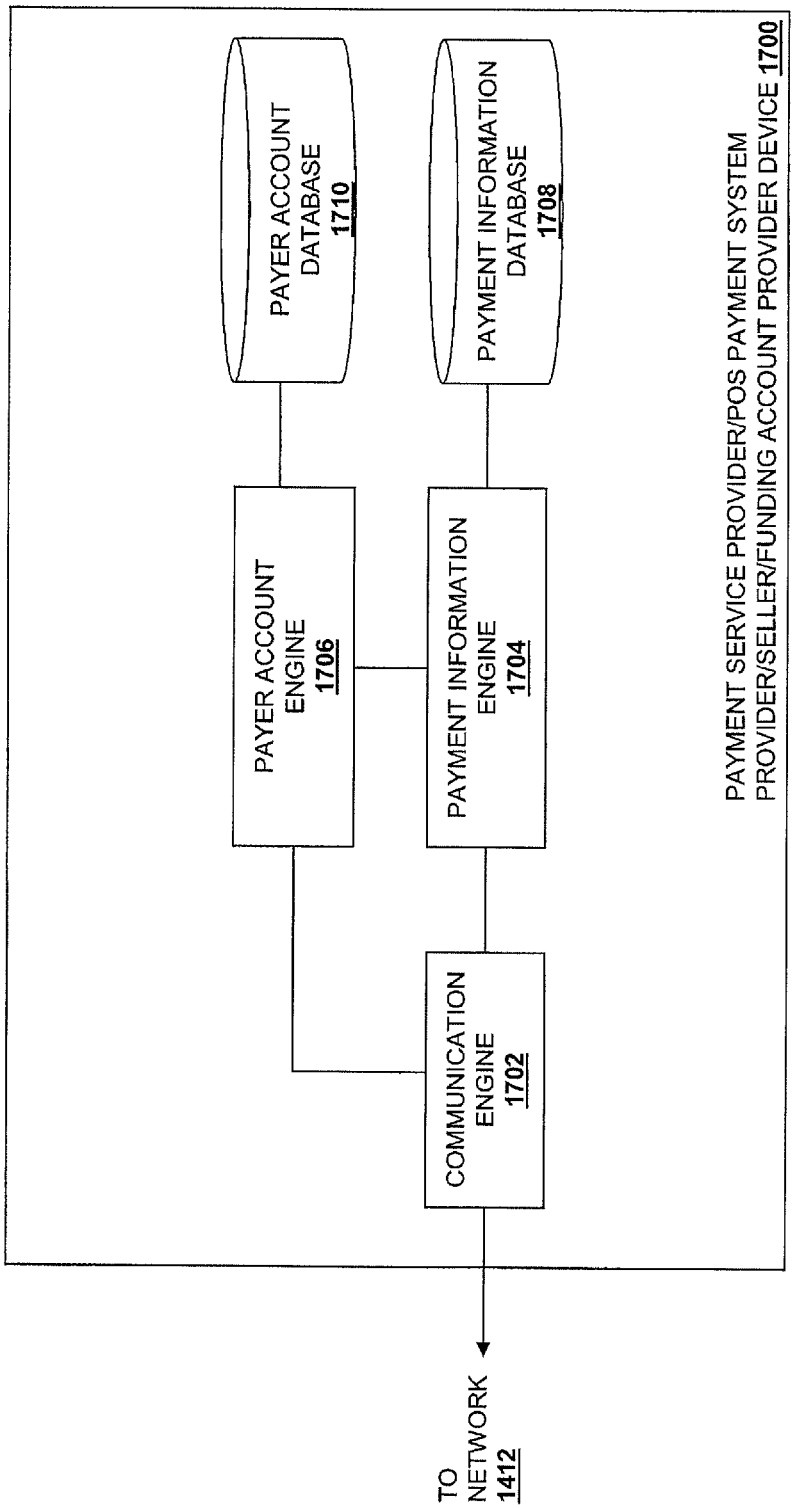
FIG. 17 is a schematic view illustrating an embodiment of a seller device, a payment service provider device, a funding account provider device, a POS payment service provider device, and/or combinations thereof.

Referring now to FIG. 17, an embodiment of a payment service provider/seller/POS payment service provider/funding account provider device 1700 is illustrated (i.e., the device 1700 may be any or combinations of the payment service provider device, the seller device, the POS payment service provider device, and/or the funding account provider device, depending on the embodiment and which entity or entities are providing the online payment system). The device 1700 includes a communication engine 1702 that is coupled to the network 1412, a payment information engine 1704, and a payer account engine 1706. The payment information engine 1704 is coupled to the payer account engine 1406 and a payment information database 1708, and the payer account engine 1706 is coupled to the payment information engine 1704 and a payer account database 1710. The communication engine 1702 may be software or instructions stored on a computer-readable medium that allows the device(s) 1700 to send and receive information over the network 1412. The payment information engine 1704 may be software or instructions stored on a computer-readable medium that is operable to receive payment information or payment code information, associate payment information with payment code information, retrieve product information from the payment information database 1706, and provide the payment information to the communication engine 1702 (e.g., for transmittal to the payer device) and/or the payer account engine 1706. The payer account engine 1706 may be software or instructions stored on a computer-readable medium that is operable to receive payer account credentials, retrieve payer account information from the payer account database 1710, receive payment information from the payment information engine 1704, and provide payer account information to the communication engine 1702 (e.g., for transmittal to the payer device). While the engines 1702, 1704, and 1706 and the databases 1708 and 1710 have been illustrated as located in the device 1700, one of skill in the art will recognize that they may be connected to one another through the network 1412 (e.g., when the online payment system is provided by more than one entity such as, for example, when the payer account engine is provided by a funding account provider and the product retrieval engine is provided by a seller) without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on sellers and payers; however, a payer or consumer can pay, or otherwise interact with any type of recipient, including charities and individuals. The payment does not have to involve a purchase, but may be a loan, a charitable contribution, a gift, etc. Thus, seller as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for point of sale payments, comprising:
    a service location that includes a plurality of payment locations and respective payment code information displayed adjacent each of the plurality of payment locations; and
    a seller device that is associated with the service location and a seller, wherein the seller device is located at the service location, coupled to a network, and includes:
        a memory storing a plurality of payment information that is associated with the seller and the service location;
        a display device; and
        a processor coupled to the memory and the display device, wherein the processor is configured to cause the seller device to perform operations comprising:
            receiving, from a first payer device wirelessly over the network, payment code information associated with a first payment location of the plurality of payment locations in the service location;
            retrieving first payment information from the plurality of payment information from the memory using the payment code information;
            providing, to the first payer device wirelessly over the network, the first payment information in a payment information graphical user interface that includes a payer service location graphic that provides a layout of the service location including relative locations of each of the plurality of payment locations, and a payment location graphic that is located in the payer service location graphic and that indicates a relative location, from the relative locations of each of the plurality of payment locations in the service location, of the first payment location associated with the payment code information;
            receiving, from the first payer device wirelessly over the network in response to at least one input received through the payment information graphical user interface provided on the first payer device, a payment location graphic adjustment that moves the payment location graphic to a different location in the payer service location graphic to provide a request to pay for a second payment location of the plurality of payment locations instead of the first payment location, along with a payment confirmation and, in response, initiating a payment from a payer account associated with the payer device to a seller account included in the payment information and sending the payment information and an indication of the payment confirmation to the seller device over the network; and providing, for display on the display device, a service location monitoring page that includes a seller service location graphic illustrating the service location and the plurality of payment locations, wherein the service location monitoring page provides a current, real-time payment location status of the plurality of payment locations in the service location by providing payer graphics in payment locations in the service location that have been paid for and indicating the payment locations in the service location that have not been paid for.

2. The system of claim 1, wherein the payment code information associated with a first payment location is provided on a sign for capture by the first payer device at the service location.

3. The system of claim 1, wherein the processor is further configured to cause the seller device to perform operations comprising:

providing, for display on the display device, a first payer graphic of the payer graphics in the seller service location graphic that indicates the relative location in the service location of the second payment location in response to receiving the payment location graphic adjustment and the payment confirmation.

4. The system of claim 1, wherein the processor is further configured to cause the seller device to perform operations comprising:

determining a payment time associated with the payment information; and calculating the payment using the payment time.

5. The system of claim 1, wherein the processor is further configured to cause the seller device to perform operations comprising:

receiving, from a second payer device over the network, the payment code information associated with the second payment location;

determining that the payment code information is associated with the payment initiated by the payer device; and sending, to the second payer device over the network, a declined payment indicator.

6. The system of claim 3, wherein the processor is further configured to cause the seller device to perform operations comprising:

receiving a selection on the service location monitoring page of the first payer graphic in the second payment location in the service location that has been paid for; and providing, for display on the display device, at least one of a payment time and a payment destination associated with the second payment location.

7. A non-transitory machine-readable medium having stored thereon machine-readable instructions executable to cause a machine to perform operations comprising:

receiving, from a payer device wirelessly over a network, payment code information associated with a first payment location of a plurality of payment locations in a service location associated with a seller device operated by a seller;

retrieving, from a database, payment information that is also associated with the payment code information;

providing, to the payer device wirelessly over the network, the payment information in a payment information graphical user interface that includes a payer service location graphic that provides a layout of the service location including relative locations of each of the plurality of payment locations, and a payment location graphic that is located in the payer service location graphic and that indicates a relative location of the relative locations in the service location of the first payment location associated with the payment code information;

receiving, from the payer device wirelessly over the network in response to at least one input received through the payment information graphical user interface provided on the first payer device, a payment location graphic adjustment that moves the payment location graphic to a different location in the payer service location graphic to provide a request to pay for a second payment location of the plurality of payment locations instead of the first payment location, along with a payment confirmation and, in response, initiating a payment from a payer account associated with the payer device to a seller account included in the payment information and sending the payment information and an indication of the payment confirmation to the seller device over the network and providing, for display on the seller device, a service location monitoring page that includes a seller service location graphic illustrating the service location and the plurality of payment locations, wherein the service location monitoring page provides a current, real-time payment location status of the plurality of payment locations in the service location by providing payer graphics in the payment locations in the service location that have been paid for and indicating the payment locations in the service location that have not been paid for.

8. The non-transitory machine-readable medium of claim 7, wherein the payment code information is provided for capture by the payer device at the service location and transmission by the payer device over the network.

9. The non-transitory machine-readable medium of claim 8, wherein the payment code information is provided for capture by a camera on the payer device.

10. The non-transitory machine-readable medium of claim 7, wherein the operations further comprise:

providing a first payer graphic of the payer graphics on the seller service location graphic that indicates the relative location in the service location of the second payment location in response to receiving the payment location graphic adjustment and the payment confirmation.

11. The non-transitory machine-readable medium of claim 7, wherein the operations further comprise:

determining a payment time associated with the payment instruction; and calculating the payment using the payment time.

12. The non-transitory machine-readable medium of claim 7, wherein the payment information includes a payment location and the operations further comprise:

receiving, from a secondary payer device over the network, the payment code information associated with the payment location;

determining that the payment code information is associated with the payment initiated by the payer device; and sending, to the secondary payer device over the network, a declined payment indicator.

13. The non-transitory machine-readable medium of claim 7, wherein the operations further comprise:

receiving, from the seller device, a selection on the service location monitoring page of a first payer graphic in the first payment location in the service location that has been paid for; and providing, for display on the seller device, at least one of a payment time and a payment destination associated with the first payment location.

14. A method for point of sale payments, comprising:

receiving, from a payer device wirelessly over a network, payment code information associated with a first payment location of a plurality of payment locations in a service location associated with a seller device operated by a seller;

retrieving, from a database, payment information that is also associated with the payment code information;

providing, to the payer device wirelessly over the network, the payment information in a payment information graphical user interface that includes a payer service location graphic that provides a layout of the service location including relative locations of each of the plurality of payment locations, and a payment location graphic that is located in the payer service location graphic and that indicates a relative location of the relative locations in the service location of the first payment location associated with the payment code information;

receiving, from the payer device wirelessly over the network in response to at least one input received through the payment information graphical user interface provided on the first payer device, a payment location graphic adjustment that moves the payment location graphic to a different location in the payer service location graphic to provide a request to pay for a second payment location of the plurality of payment locations instead of the first payment location, along with a payment confirmation and, in response, initiating a payment from a payer account associate with the payer device to a seller account included in the payment information and sending the payment information and an indication of the payment confirmation to the seller device over the network; and providing, for display on the seller device, a service location monitoring page that includes a seller service location graphic illustrating the service location and the plurality of payment locations, wherein the service location monitoring page provides a current, real-time payment location status of the plurality of payment locations in the service location by providing payer graphics in payment locations in the service location that have been paid for and indicating the payment locations in the service location that have not been paid for.

15. The method of claim 1, wherein the payment code information is provided for capture by the payer device at the service location and transmission by the payer device over the network.

16. The method of claim 15, wherein the payment code information is provided for capture by a camera on the payer device.

17. The method of claim 14, further comprising:

providing a first payer graphic of the payer graphics in the seller service location graphic that indicates the relative location in the service location of the second payment location in response to receiving the payment location graphic adjustment and the payment confirmation.

18. The method of claim 14, further comprising:

determining a payment time associated with the payment information; and calculating the payment using the payment time.

19. The method of claim 14, wherein the payment information includes a payment location and the method further comprises:

receiving, from a secondary payer device over the network, the payment code information associated with the payment location;

determining that the payment code information is associated with the payment initiated by the payer device; and sending, to the secondary payer device over the network, a declined payment indicator.

20. The method of claim 14, further comprising:

receiving, from the seller device, a selection on the service location monitoring page of a first payer graphic in the first payment location in the service location that has been paid for; and providing, for display on the seller device, at least one of a payment time and a payment destination associated with the first payment location.

21. The system of claim 1, wherein the current, real-time payment location status of the plurality of payment locations in the service location on service location monitoring page includes time expired indicators for each payer graphic on the seller service location graphic that is associated with a payment location in the service location that is currently occupied but no longer paid for.

22. The non-transitory machine-readable medium of claim 7, wherein the current, real-time payment location status of the plurality of payment locations in the service location on service location monitoring page includes time expired indicators for each payer graphic on the seller service location graphic that is associated with a payment location in the service location that is currently occupied but no longer paid for.

23. The method of claim 14, wherein the current, real-time payment location status of the plurality of payment locations in the service location on service location monitoring page includes time expired indicators for each payer graphic on the seller service location graphic that is associated with a payment location in the service location that is currently occupied but no longer paid for.

* * * * *